United States Patent
Kassamakov et al.

(10) Patent No.: US 10,345,093 B2
(45) Date of Patent: Jul. 9, 2019

(54) ARRANGEMENT AND METHOD OF DETERMINING PROPERTIES OF A SURFACE AND SUBSURFACE STRUCTURES

(71) Applicant: UNIVERSITY OF HELSINKI, Helsingin Yliopisto (FI)

(72) Inventors: Ivan Kassamakov, Helsingin Yliopisto (FI); Edward Haeggström, Helsingin Yliopisto (FI)

(73) Assignee: UNIVERSITY OF HELSINKI, Helsingin Yliopisto (FI)

( * ) Notice: Subject to any disclaimer, the term of this patent is extended or adjusted under 35 U.S.C. 154(b) by 0 days.

(21) Appl. No.: 16/061,285

(22) PCT Filed: Dec. 11, 2015

(86) PCT No.: PCT/FI2015/050876
§ 371 (c)(1),
(2) Date: Jun. 12, 2018

(87) PCT Pub. No.: WO2017/098079
PCT Pub. Date: Jun. 15, 2017

(65) Prior Publication Data
US 2018/0372476 A1    Dec. 27, 2018

(51) Int. Cl.
*G01B 9/02*    (2006.01)
*G02B 27/58*    (2006.01)
(Continued)

(52) U.S. Cl.
CPC ......... *G01B 9/0209* (2013.01); *G01B 9/0201* (2013.01); *G01B 9/02035* (2013.01); *G01B 9/02067* (2013.01); *G02B 21/0016* (2013.01); *G02B 21/0056* (2013.01); *G02B 27/58* (2013.01); *H05B 41/34* (2013.01)

(58) Field of Classification Search
CPC ............... G01B 9/0209; G01B 9/0201; G01B 9/02035; G01B 9/02049; G01B 9/02085
See application file for complete search history.

(56) References Cited

U.S. PATENT DOCUMENTS 8,445,188 B2 * 5/2013 Mohseni .................. G03F 7/20
                                                           430/324
2007/0013916 A1   1/2007 Kim et al.
(Continued)

OTHER PUBLICATIONS

International Search Report, PCT/FI2015/050876, dated Aug. 9, 2016.
(Continued)

*Primary Examiner* — Jonathan M Hansen
(74) *Attorney, Agent, or Firm* — Young & Thompson

(57) ABSTRACT

An arrangement for determining four-dimensional properties of an interface of an object, including a light source includes: a unit for forming photonic jets, a unit for performing large field of view interferometric imaging of the interface and their combination, a unit for passing the light being close to the interface and direct the light to the interface, and an image unit. The arrangement includes a unit for performing phase shifting interferometric imaging of the interface, imaging a unit for receiving light from the interface modulated by e.g. microspheres for forming super-resolution image information by combining light interferometry with the photonic jets, and a processor unit for determining four-dimensional properties of the interface on the basis of the image information formed by the phase shifting interferometric imaging by utilizing effect of the photonic jets. The arrangement also can also include a unit to carry out the measurement using polarized light.

24 Claims, 4 Drawing Sheets

Figure 1:
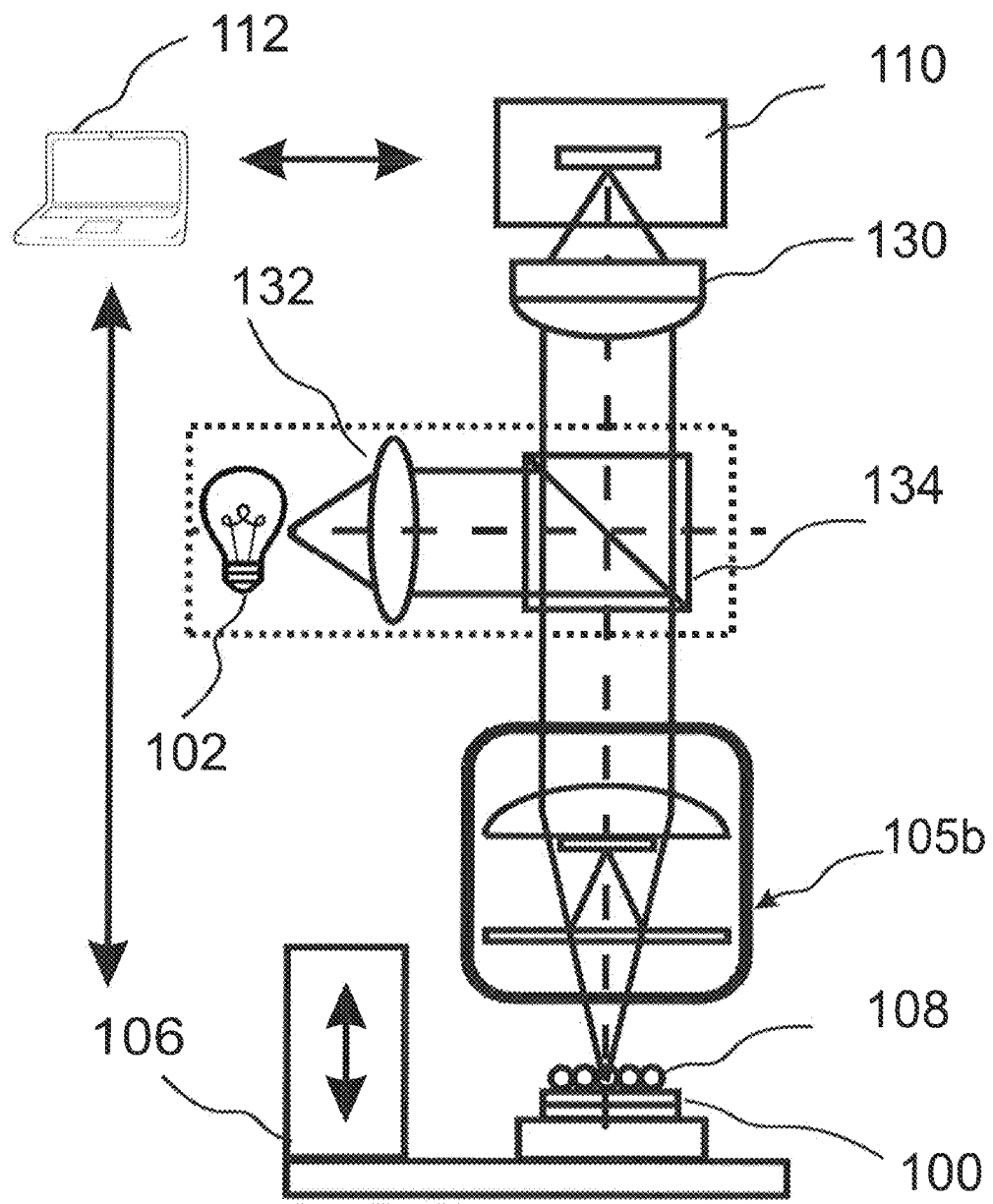

(51) Int. Cl.
*G02B 21/00* (2006.01)
*H05B 41/34* (2006.01)

(56) References Cited

U.S. PATENT DOCUMENTS

2011/0261347 A1* 10/2011 Kassamakov ...... G01B 11/0675
356/51
2013/0215495 A1* 8/2013 Thylen ................... G02B 6/125
359/341.3

OTHER PUBLICATIONS

Igor Shavrin et al: "Stroboscopic white-light interferometry of vibrating microstructures", Optics Express, vol. 21, No. 14, Jul. 8, 2013 (Jul. 8, 2013), p. 16901, XP055292325, DOI: 10.1364/0E.21.016901, abstract Sections 1 and 2; figures 1, 2.
Darafsheh Arash et al: "Biological super-resolution imaging by using novel microsphere-embedded coverslips", Progress in Biomedical Optics and Imaging, SPIE—International Society for Optical Engineering, Bellingham, WA, US, vol. 9337, Mar. 11, 2015 (Mar. 11, 2015), pp. 933705-933705, XP060046251, ISSN: 1605-7422, DOI: 10.1117/12.2078019 ISBN: 978-1-5106-0027-0.
Yinzhou Yan et al: "Microsphere-Coupled Scanning Laser Confocal Nanoscope for Sub-Diffraction-Limited Imaging at 25 nm Lateral Resolution in the Visible Spectrum", ACS Nano, vol. 8, No. 2, Feb. 25, 2014 (Feb. 25, 2014), pp. 1809-1816, XP055292069, US ISSN: 1936-0851, DOI: 10.1021/nn406201q, abstract p. 1809-p. 1812, paragraph 1; figures 1-4.
Feifei Wang et al: "Three-Dimensional Super-Resolution Morphology by Near-Field Assisted White-Light Interferometry", Scientific Reports, vol. 6, Apr. 22, 2016 (Apr. 22, 2016), p. 24703, XP055292068, DOI: 10.1038/srep24703 the whole document.

* cited by examiner

ARRANGEMENT AND METHOD OF DETERMINING PROPERTIES OF A SURFACE AND SUBSURFACE STRUCTURES

FIELD OF THE INVENTION

Low coherence interferometry (LCI), particularly Scanning White Light Interferometry (SWLI), is a widely used 3D surface characterization method featuring sub-nanometer resolution in vertical direction. By combing SWLI with optical jet structures one achieves 3D super resolution imaging.

STATE OF THE ART

Light sources for SWLI are halogen lamps or white-light light-emitting diodes (LED) imaged into the objective pupil in a Köhler geometry. The illumination field and aperture are controlled. The light source may be stroboscopic to freeze oscillating motion, and the emission spectrum may be electronically controllable. The source wavelengths are visible or infrared (1-2 or 10 µm).

Area imaging sensor camera (CCD, CMOS) for SWLI has from 640×480 pixels to 40+ million pixels. Camera selection involves field size and number of pixels as well as acquisition speed, response linearity, quantum well depth, and digitization resolution.

Reference surface/mirror (Michelson type interferometer configuration) is aluminized glass, silicon carbide (SiC), or bare glass, depending on sample reflectivity. The mirror in a Mirau type interferometer configuration is a small metallic coating, slightly larger in diameter than the field of view, on a transparent reference plate. The optical system of a LCI device employs infinite conjugate optics with telecentric imaging, and magnification determined by the combined action of the objective and tube lens. The measurement principle requires engineering and adjusting the objective so that the zero group-velocity optical path difference position is identical to the position of the best focus. The Michelson objective achieves this with a dispersion balanced cube beam splitter. In a Mirau microscope, the beam splitter and reference plate should match in optical thickness to minimize dispersion.

Lateral resolution can be determined e.g. in the following way. The Abbe diffraction limit ($d_{x,y}$) is the smallest lateral periodicity in a structure, which can be discriminated in its image:

$$d_{x,y}=1.22\lambda/2NA \quad (1)$$

where $\lambda$ is the center wavelength of the light and NA is the numerical aperture of the lens. When imaging with visible light ($\lambda$~400-750 nm) and commonly used objectives with NA=1.4, the lateral resolution is approximately 200 nm.

The diffraction limit is due to loss of evanescent waves in the far field. These evanescent waves carry high spatial frequency sub-wavelength information of an object and decay exponentially with distance.

The axial image resolution ($d_z$) is 2-3 times larger than the lateral resolution, around 440 nm.

$$d_z=2n\lambda/NA^2 \quad (2)$$

where n is the refractive index of the medium in which light propagates.

Any microscopy technique that overcomes the resolution limit by factor of 2 or higher is considered to provide super-resolution.

Scanning electron microscopes (SEM) can provide 3D nano-resolution images by e.g. using several electron guns or detectors simultaneously. These devices do not provide super resolution.

Low coherence interferometry, i.e. SWLI, overcomes the axial resolution limit and allows superior-resolution along the vertical direction (sub-nanometer).

Near field techniques offer lateral and vertical super-resolution. Optical near-field microscopy is based on measuring scattered light, close to a near-field probe, which is generated by optical near-field interaction between the near-field probe and a specimen. Near-field probe tips of known shape are used to achieve high local resolution, e.g. contacting atomic force microscope (AFM) and noncontacting scanning tunneling microscope (STM) tips. The near-field probe can be illuminated by focused light to generate scattered light.

There are noncontacting techniques based on photonic nanojets that permit 50 nm lateral resolution in the x-y plane but much worse axial resolution (z-direction).

The photonic nanojet is a narrow, high-intensity, non-evanescent light beam that can propagate a distance longer than the wavelength $\lambda$ after emerging from the shadow-side surface of an illuminated lossless dielectric microcylinder or microsphere of diameter larger than $\lambda$. The nanojet's minimum beamwidth can be smaller than the classical diffraction limit, in fact as small as ~$\lambda/3$ for microspheres.

US patent application 2010/0245816 A1 describes near-field Raman imaging, performed by holding a dielectric microsphere (e.g. of polystyrene) on or just above the sample surface in a Raman microscope. An illuminating laser beam is focused by the microsphere to produce near-field interaction with the sample. Raman scattered light at shifted wavelengths is collected and analyzed. The microsphere may be mounted on an AFM cantilever or on some other scanning probe microscope that provides feedback to keep it in position relative to the sample surface. Alternatively, the microsphere may be held on the sample surface by the optical tweezer effect of the illuminating laser beam. One disadvantage of this device is the vertical resolution which depends strongly on the confocal design of the Raman microscope being used. For a true confocal design (which incorporates a fully adjustable confocal pinhole aperture) depth resolution is on the order of 1-2 µm.

Probes of scanning near-field optical microscopes create electromagnetic field characteristics that are maximally localized near a nano-sized point (miniature apertures and tips, fluorescent nano-particles and molecules, dielectric and metal corners). However, the probe field, which is distributed across a larger area, can provide super-resolution as well. For this purpose, the field spectrum should be enriched with high spatial frequencies corresponding to small dimensions of the sample. As examples of such nearfield probes, US patent 2009/0276923 A1 proposes and theoretically studies models of optical fibers whose end-face features sharp linear edges and randomly distributed nanoparticles. These kinds of probes are mechanically more robust than conventional probes—fabricated by using a combination of a two-step chemical etching and focused ion beam milling and their manufacturing does not require nanoscale precision. The optical probes enable waveguiding of light to and from the sample with marginal losses by distributing and utilizing the incident light more completely than conventional probes. Numerical modeling shows that, even with substantial measurement noise, these probes can resolve objects that are significantly smaller than the probe size and, in certain cases, can perform better than conventional nanoprobes. One disadvantage of this device is that it measures point by point.

Patent application document WO 2013/043818 A1 describes a system and method for imaging a surface, including a nano-positioning device including a cantilever with an optically transparent microsphere lens coupled to the distal end of the cantilever. An optical component can focus light on at least a portion of the surface through the microsphere lens, and the focused light, if any, reflects back from the surface through the microsphere lens. A control unit communicatively coupled with the nanopositioning device can be configured to position the microsphere lens at a predetermined distance above the surface. One disadvantage of this device is the vertical resolution which is diffracted limited.

In far-field microscopy, imaging contrast is often low and unsatisfactory due to out-of-focus light in the final image. To enhance contrast, one can optimize the microscope lighting condition and imaging software settings during imaging. In contrast to far-field microscopy, confocal microscopy techniques generally have better optical contrast and improved resolution; this is achieved by placing a tiny pinhole before the detector to eliminate out-of-focus light in the final image. When combining laser confocal microscopy with microspheres, multiple concentric rings in the confocal imaging appears if one uses closely positioned spheres. These rings result from near-field interactions between the particle or spheres and the substrate under coherent laser illumination. In contrast, an incoherent light source, renders this issue less obvious in far-field microscopy. These rings degrade imaging quality, which may pose a practical limit on the minimum feature that can be resolved in confocal imaging.

Prior art embodiments suffer from these artefacts that might wrongly be interpreted as objects in the image. For isolated and known particles, one can still see the true image of the objects through the particles. The artefact issue is less obvious in a far-field nanoscopy system where an incoherent lighting source is often used.

Prior art describes polarization as a way to enhance contrast especially in bioimaging. There are many studies on polarization in far-field microscopy and also several studies on polarization-SWLI for both imaging static and moving samples. There are some studies on the use of polarization in near field microscopy but it has never been used in 3D super-resolution imaging. Prior art publications fails to present 3D calibration at the nanometer scale.

SHORT DESCRIPTION OF THE INVENTION

An object of the present invention is to achieve an improved 3D super resolution imaging system and method for determining surface topographies and/or subsurface structures. This is achieved by an arrangement for determining three-dimensional properties of an interface of an object. The arrangement comprises means for interferometric imaging which means comprises:
 a light source,
 imaging means for forming an interference image based on interference between light arriving at the imaging means from the interface of the object and light arriving at the imaging means from a reference path related to the interferometric imaging, and
 means for forming the reference path from the light source to the imaging means, for directing light from the light source towards the interface of the object, and for directing light from the interface of the object to the imaging means.

The arrangement further comprises means constituting a near field modifying structure for forming, from the light directed towards the interface of the object, one or more photonic jets directed to the interface of the object, wherein the means for interferometric imaging is arranged to perform the interferometric imaging through the means constituting the near field modifying structure.

An arrangement according to an exemplifying embodiment of the invention is an arrangement for determining four-dimensional properties of an interface of an object. The arrangement comprises a light source, means for forming photonic jets to be utilized in imaging of the interface, means for performing large field of view interferometric imaging of the interface and of a combination of the interface and the means for forming the photonic jets, means for passing said light being close to the interface and direct the light to the interface, and said means create an image, and the arrangement comprises means for performing phase shifting interferometric imaging of the interface, imaging means for receiving light from the interface modulated by at least one of microspheres and near field modifying structures for forming super-resolution image information by combining light interferometry with the photonic jets, and a processor unit for determining four-dimensional properties of the interface on the basis of the image information formed by said phase shifting interferometric imaging by utilizing the effect of the photonic jets.

An object of the invention is also a method for determining three-dimensional properties of an interface of an object. The method comprises:
 directing light from a light source to a reference path related to interferometric imaging,
 directing light from the light source towards the interface of the object, and
 performing the interferometric imaging so as to form an interference image based on interference between light arriving from the interface of the object and light arriving from the reference path, The above-mentioned interferometric imaging is performed through means constituting a near field modifying structure for forming, from the light directed towards the interface of the object, one or more photonic jets directed to the interface of the object.

A method according to an exemplifying embodiment of the invention is a method for determining four-dimensional properties of an interface of an object. In the method is produced light, is formed photonic jets to be utilized in imaging of the interface, is performed large field of view interferometric imaging of the interface and of a combination of the interface and the means for forming the photonic jets, is passed said light close to the interface and is directed the light to the interface, and is created an image, and is performed phase shifting interferometric imaging of the interface, is received light from the interface modulated by at least one of microspheres and near field modifying structures for forming super-resolution image information by combining light interferometry with the photonic jets, and is determined four-dimensional properties of the interface on the basis of the image information formed by said phase shifting interferometric imaging by utilizing the effect of the photonic jets.

The invention is based on photonic jets which are utilized in imaging of the interface, and on performing large field of view interferometric imaging of the interface and of a combination of the interface and the means for forming the photonic jets. Light is passed close to the interface and is directed to the interface, and is created an image. The invention can be further based on phase shifting interferometric imaging of the interface, and on light received from the interface modulated by microspheres for forming super-resolution image information by combining light interferometry with the photonic jets.

A benefit of the invention is that label free, noncontact, large field of view and fast determination of four-dimensional properties of an interface of an object can be achieved.

SHORT DESCRIPTION OF FIGURES

FIG. 1 presents first exemplary embodiment according to the present invention.

Figure 2:
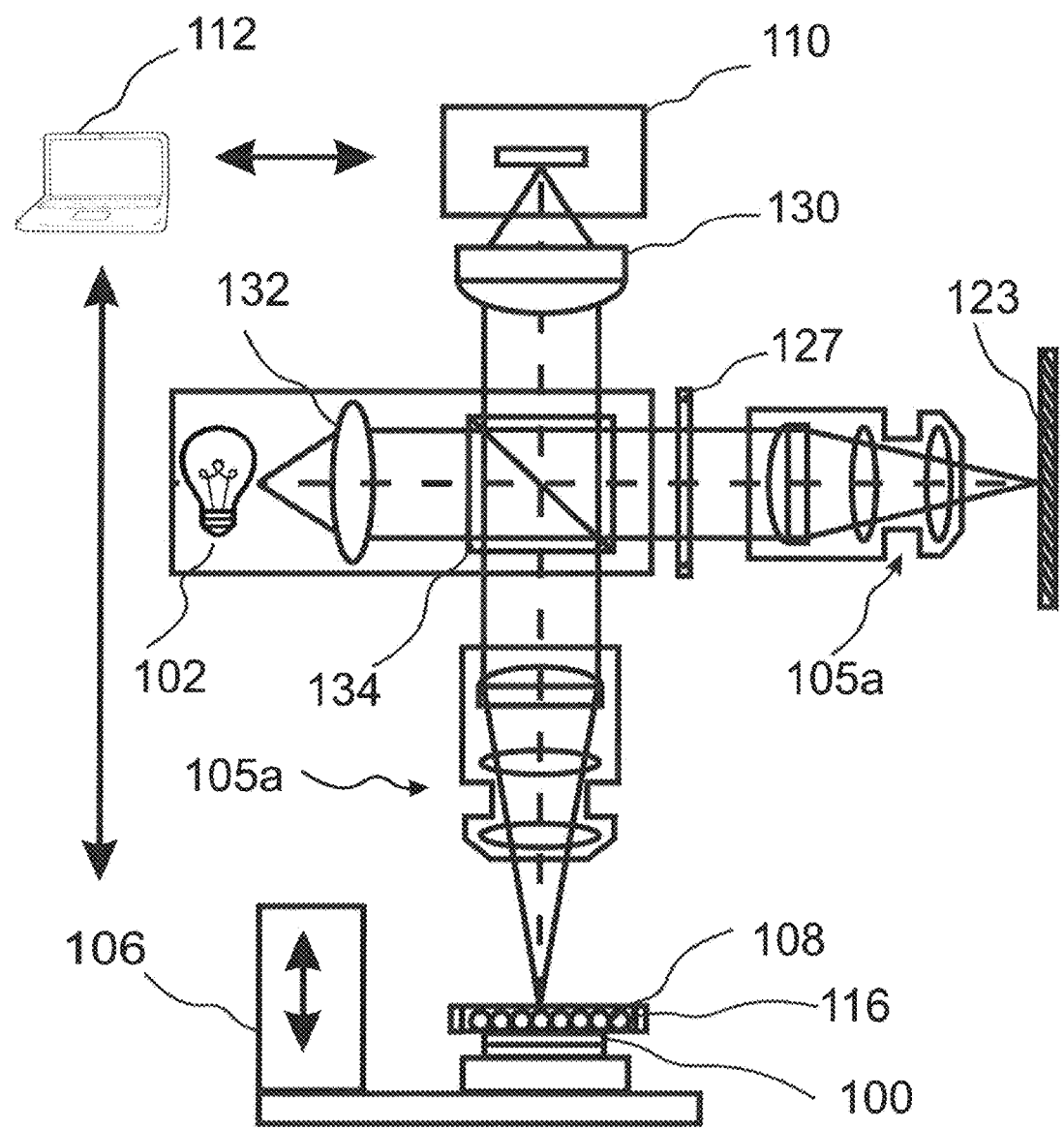

FIG. 2 presents second exemplary embodiment according to the present invention.

Figure 3:
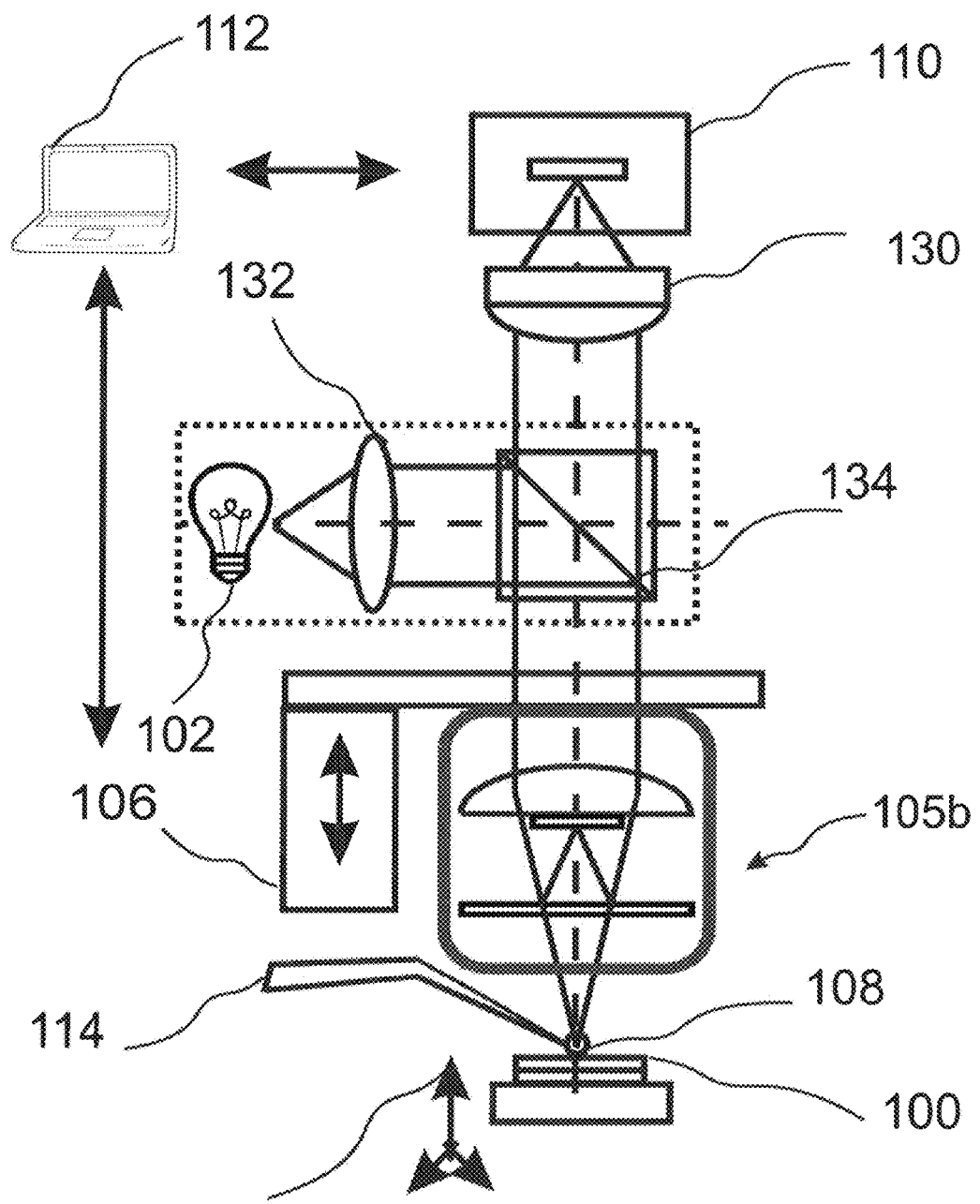

FIG. 3 presents preferred embodiment according to the present invention.

Figure 4:
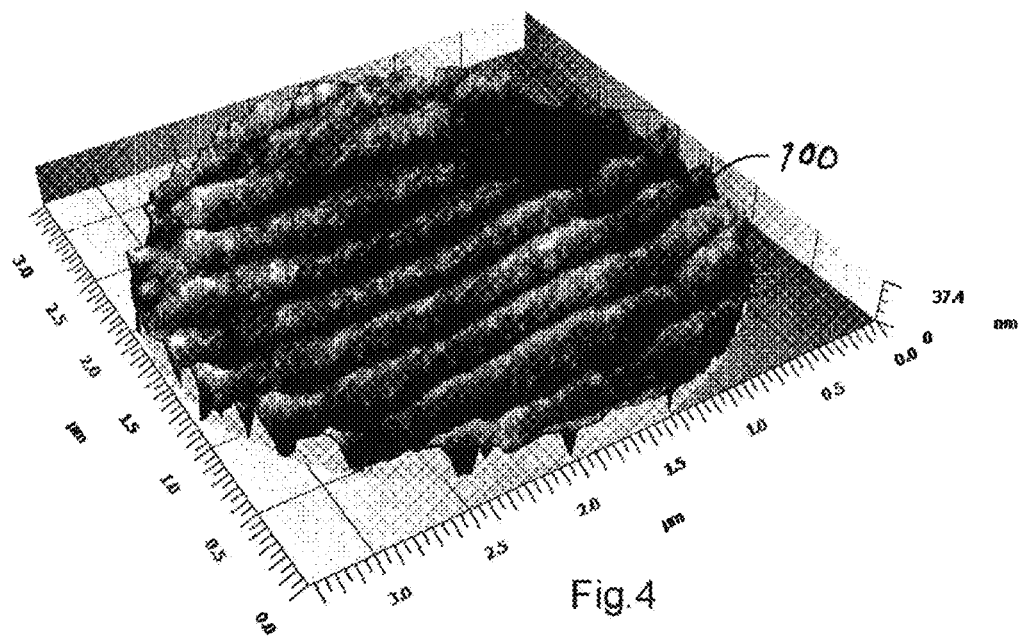

FIG. 4 presents an example of a surface imaged according to the invention.

DETAILED DESCRIPTION OF THE INVENTION

According to the present invention can be achieved non-contacting large field of view 3D super-resolution imaging by combining light interferometry for the z axis and photonic jet for the xy-plane. The light interferometry can be e.g. so called white light interferometry. The z axis imaging uses a real image, injects light into the near-field modifying structure, e.g. a sphere, and extracts through the sphere light reflected from the interface. In the xy plane imaging is injected light into the sphere, is extracted light through the sphere and from outside of the sphere, and is used a virtual image of the interface.

In FIGS. 1, 2, and 3 are presented exemplary preferred embodiments according to the invention, in which an arrangement for determining four-dimensional properties of an interface 100 of an object comprises a light source 102. Four dimensional means 3D (xyz dimensions) and time domain. The interface 100 can be a surface of the object or a subsurface of the object, i.e. a so called buried surface. The arrangement comprises means for forming photonic jets to be utilized in imaging of the interface 100 and means 105a, b for performing large field of view interferometric imaging of the interface 100 and of a combination of the interface and the means for forming the photonic jets. In one embodiment the arrangement can comprise means for performing image stitching to stitch either separately or together both super-structure and substructure to have large field of view. The means for forming photonic jets can comprise at least one of a microsphere and micro cylinder and micro-lense (e.g. Fresnel) and grid and cubes and metamaterials and negative refractive index materials, as well as any near-field modifying structure of a specified and known shape or of an unspecified shape when one can use a known target to extract a so called point spread function. Also the means for forming photonic jets can comprise e.g. polymer or polymer-like material with photonic jets. The photonic jets can be e.g. nanojets or equivalents. In one embodiment the arrangement can also comprise means for performing the measurements using polarized light.

The arrangement according to the invention comprises means 108 for passing said light that are close to the interface 100 and direct the light to the interface, and create an image, and means 106 for performing phase shifting interferometric imaging of the interface 100. The means 108 are preferably microspheres 108, which can be e.g. high-index microspheres 118 embedded partially or fully in a substantially thin transparent host material 116. In one embodiment means 106 for moving the object can be used as the means 106 for performing phase shifting interferometric imaging of the surface 100. The means 106 for moving the object can be e.g a glass micropipette 114 attached to the microspheres 108 for moving the microspheres 108 and another tip to locally actuate the surface of the object, which is e.g. cell. In another embodiment the means 106 for performing phase shifting interferometric imaging of the surface 100 can comprise utilization of stroboscopic illumination.

The arrangement according to the invention further comprises imaging means 110 for receiving light from the interface 100 modulated by microspheres 108 for forming super-resolution image information by combining light interferometry with the photonic jets, and a processor unit 112 for determining four-dimensional properties of the interface 100 on the basis of the image information formed by said phase shifting interferometric imaging by utilizing the effect of the photonic jets. The imaging means 110 can be e.g. a CCD camera. In FIG. 4 is presented an example of a surface 100 imaged according to the invention.

In one embodiment the arrangement can comprise means for performing same field of view calibration on the basis of an improved nanoruler concept where one has added a grid to the lowest step in order to allow simultaneous z axis and xy axis calibration. The means can be e.g. a stack of Langmuir Blodgett films on e.g. a microscope glass. The grid can be created with e.g. short wavelength lithography.

In another embodiment the arrangement can comprise means 124 for forming coherence function to achieve minimum main lobe width and sufficient side lobe reduction in order to remove impact of the photonic jet layer and to allow maximum resolution. The means 124 can be accomplished e.g. by using a light source with different coherence length or by using a rough disc to break the coherence of the light source or by combining in suitable way several light sources.

In one further embodiment the arrangement can comprise means 126 for managing polarization to create at least one of phase shift, transient imaging, and enhanced image contrast. The means 126 can be accomplished e.g. by placing polarizer in front of the light source and an analyzer in front of the large area detector or by using pixelated polarizers.

In some embodiment according to the invention the arrangement can comprise means for accounting for the distortion of the surface topography created by the finite size shape of the photonic jet. These means can be incorporated e.g. by relying on deconvolution approaches similar to those used to correct for the finite tip size in AFM imaging.

In the following is described more detailed features of the different embodiments according to the present invention. LCI (SWLI) and the photonic nanojet technology are combined to achieve 3D super-resolution featuring tenths of nanometers lateral and vertical resolution. This should provide voxels that are more equilateral (symmetric) and smaller than previously achieved. The device permits label-free non-contacting imaging of both surfaces and buried structures that may be static or may move. The full field of view techniques provides fast and simultaneous view of all points on a fairly large area. Traceability of the image dimensions can be achieved using the nanoruler approach. The device, i.e. arrangement according to the invention can be hand held.

In one embodiment presented in FIG. 1 is used a SWLI setup with a Mirau interference objective 105b. The nanojet can be achieved by using microsphere or micro cylinders or micro-lense or grid or cubes or metamaterials or negative refractive index materials or nanoparticles of a specified and known shape—spherical, hemi-spherical or other shape to produce nanojets. In addition, a wetting layer, serving as a lubricant, could be used. Nanojet particles could be freely placed on the sample or embedded partly or entirely in the polymer material using e.g. self-assembly technics, forming single or multilayered structure. In the latter case attention should be paid to the thickness of the layer.

In another embodiment presented in FIG. 2 is used a Linnik or Michelson configuration 105a, which allows use of different conventional objectives and which also permits layer thickness compensation in case polymers are used as an embedding material. It also allows subsurface imaging, i.e. imaging of buried structures.

These embodiments in microscopy require control of the positioning of the microspheres during scanning. Two approaches to solve this problem are: (1) the microsphere is moved with a fine glass micropipette attached to the microsphere, (2) high-index microspheres ($TiO_2$ or $BaTiO_3$) can be partly or fully embedded in a transparent host material (e.g. PMMA, PDMS), having a thickness similar to a standard coverslip, which is thin enough for the micro-lens or near-field modifying structure to be directly inserted into the gap between a conventional microscope's objective lens and the sample. Preferred sizes of the microspheres is e.g. 10 micrometers with refractive index of the material being e.g. 1.6, and magnification of the objectives used in the arrangement is e.g. 50×.

The embodiments according to the present invention can be utilized e.g. in the following applications:

I The invention can be utilized in drug development. It helps high-throughput screening. It helps development of personalized treatment cocktails at the bed side for cancer treatment. It is a physical way of doing dissolution tests on complex drug-carrying drug-delivery devices. With this super-resolution technique one can precisely measure erosion of the drug delivery devices. This means that one does not have to carry out chemical dissolution tests that can be slower and that may require more substance for the tests. Moreover, the same approach can be used for any kind of nanochemistry-like approach where one either adds nanoparticles to a surface or to a construct or remove them either actively or passively.

II The invention can be utilized in tests of fibers and constructs produced by ultrasound enhanced electrical spinning, —a way to produce drug-laden nanofibers. These fibers can be used e.g. in fiber constructs whose diameters are controlled to allow controlled release profiles. Such fibers could e.g. react to the surrounding glucose level and release insulin on demand.

In prior art the only way to image these nanoscale constructs is AFM or SEM, which are complex and slow.

III The invention allows one to rapidly take images of nanoparticles of size below one hundred nanometers. These kinds of nanoparticles can give existing failed drug components a second chance. It is important for quality assurance purposes to see these nanoparticles when you produce them. This cannot be done with SEM or AFM, because they are too slow.

IV According to the invention can be provided a tool for supersurface and subsurface bioimaging in a label free manner at nanometer resolution. Imaging using dyes as well as label free AFM imaging suffer according to prior art from serious problems.

V According to the invention can be provided a read-out device for security applications where can be used embedded nanodots as a way to ensure authenticity.

Although the invention has been presented in reference to the attached figures and specification, the invention is not limited to those as the invention is subject to variations within the scope allowed for by the claims according to different kind of applications.

The invention claimed is:

1. An arrangement for determining three-dimensional properties of an interface of an object, the arrangement comprising means for interferometric imaging, wherein the means for interferometric imaging comprises:
   a light source,
   imaging means for forming an interference image based on interference between light arriving at the imaging means from the interface of the object and light arriving at the imaging means from a reference path related to the interferometric imaging, and
   means for forming the reference path from the light source to the imaging means, for directing light from the light source towards the interface of the object, and for directing light from the interface of the object to the imaging means,
wherein the arrangement further comprises means constituting a near field modifying structure for forming, from the light directed towards the interface of the object, one or more photonic jets directed to the interface of the object, wherein the means for interferometric imaging is arranged to perform the interferometric imaging through the means constituting the near field modifying structure.

2. An arrangement according to claim 1, wherein the arrangement comprises means for changing a phase-shift between the light arriving at the imaging means from the reference path and the light arriving at the imaging means from the interface of the object.

3. An arrangement according to claim 2, wherein the means for changing the phase-shift comprise means for moving the object.

4. An arrangement according to claim 1, wherein the arrangement comprises a processor unit for controlling the means for interferometric imaging to produce a temporal sequence of interference images of the interface of the object.

5. An arrangement according to claim 1, wherein the means for interferometric imaging comprises means for performing the interferometric imaging with stroboscopic illumination.

6. An arrangement according to claim 1, wherein the arrangement comprises means for performing image stitching to stitch interference images corresponding to fields of view into a combined interference image corresponding to a combination of the fields of view.

7. An arrangement according to claim 1, wherein the arrangement comprises means for performing calibration of the interferometric imaging on the basis of a nanoruler concept in which a grid is in a same field of view together with the object being imaged in order to allow simultaneous calibration in vertical and lateral directions.

8. An arrangement according to claim 1, wherein the arrangement comprises means for optimizing a coherence function of the light used in the interferometric imaging in order to maximize resolution, the means for optimizing the coherence function comprising one of the following: the light source with a coherence length selected to provide the coherence function, a disc for breaking coherence of the light used in the interferometric imaging, the light source constituted by a combination of several light sources.

9. An arrangement according to claim 1, wherein the arrangement comprises means for managing polarization of the light used in the interferometric imaging.

10. An arrangement according to claim 1, wherein the arrangement comprises means for accounting for the distortion of the surface topography created by the finite size shape of the one or more photonic jets.

11. An arrangement according to claim 1, wherein the means constituting the near field modifying structure comprises one or more particles each being one of the following: a microsphere, a microhemisphere, a microcylinder, a microlens, a microcube, a piece of metamaterial, a piece negative refractive index material.

12. A method for determining three-dimensional properties of an interface of an object, the method comprising:
   directing light from a light source to a reference path related to interferometric imaging,
   directing light from the light source towards the interface of the object, and
   performing the interferometric imaging so as to form an interference image based on interference between light arriving from the interface of the object and light arriving from the reference path,
wherein the interferometric imaging is performed through means constituting a near field modifying structure for forming, from the light directed towards the interface of the object, one or more photonic jets directed to the interface of the object.

13. A method according to claim 12, wherein the interface of the object is a surface of the object.

14. A method according to claim 12, wherein the interface of the object is a subsurface of the object.

15. A method according to claim 12, wherein the method comprises changing a phase-shift between the light arriving from the reference path and the light arriving from the interface of the object.

16. A method according to claim 15, wherein the method comprises moving the object so as to change the phase-shift.

17. A method according to claim 12, wherein stroboscopic illumination is used in the interferometric imaging.

18. A method according to claim 12, wherein the method comprises stitching interference images corresponding to fields of view into a combined interference image corresponding to a combination of the fields of view.

19. A method according to claim 12, wherein the method comprises performing calibration of the interferometric imaging on the basis of a nanoruler concept in which a grid is in a same field of view together with the object being imaged in order to allow simultaneous calibration in vertical and lateral directions.

20. A method according to claim 12, wherein the method comprises optimizing a coherence function of the light used in the interferometric imaging in order to maximize resolution, the optimizing the coherence function comprising one of the following: selecting a coherence length of the light source to provide the coherence function, using a disc for breaking coherence of the light used in the interferometric imaging, using a combination of several light sources as the light source.

21. A method according to claim 12, wherein the method comprises managing polarization of the light used in the interferometric imaging.

22. A method according to claim 12, wherein the method comprises accounting for the distortion of the surface topography created by the finite size shape of the one or more photonic jets.

23. A method according to claim 12, wherein the means constituting the near field modifying structure comprises one or more particles each being one of the following: a microsphere, a microhemisphere, a microcylinder, a microlens, a microcube, a piece of metamaterial, a piece negative refractive index material.

24. A method according to claim 12, wherein the method comprises producing a temporal sequence of interference images of the interface of the object.

* * * * *